Patented July 17, 1928.

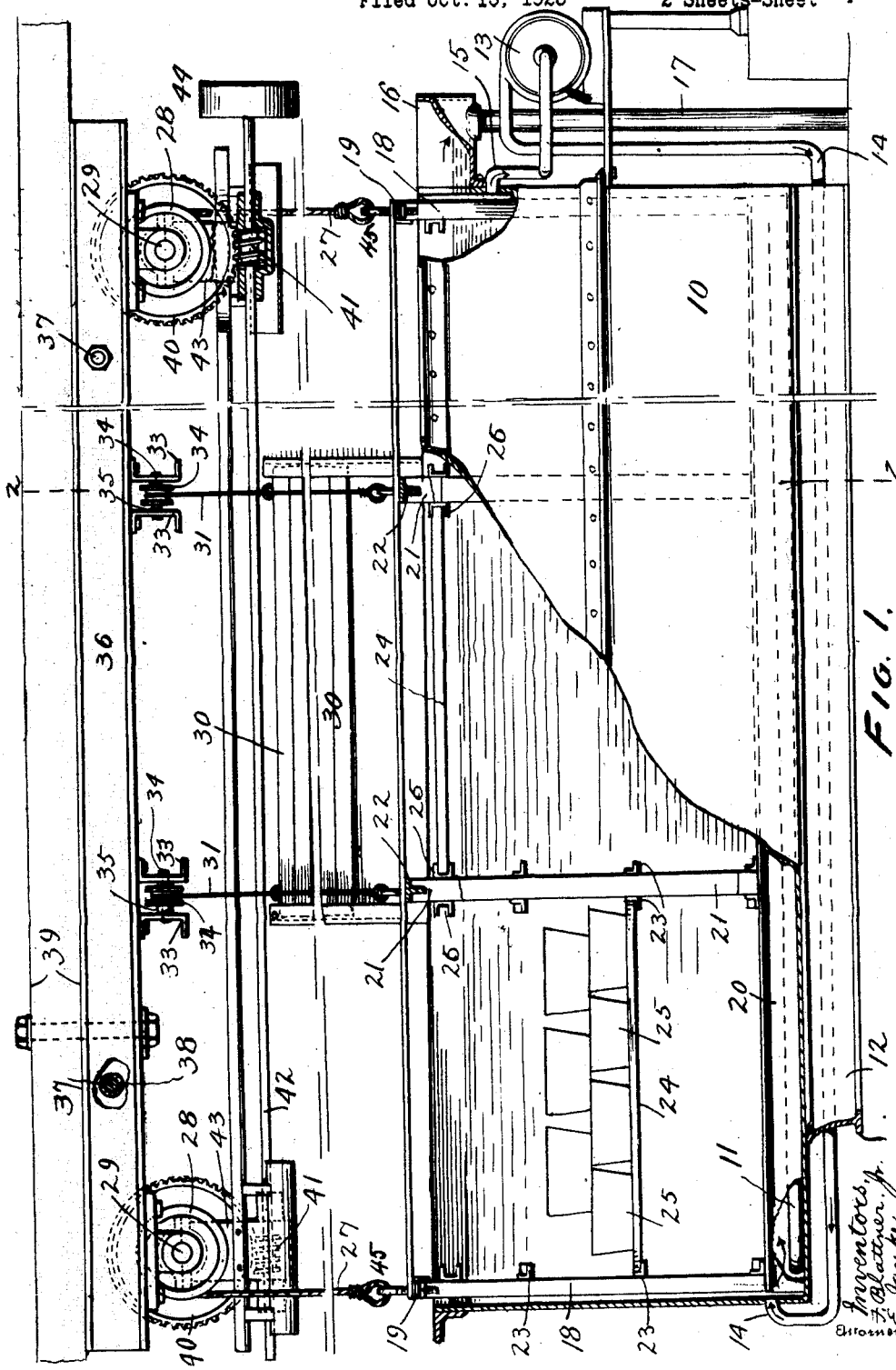

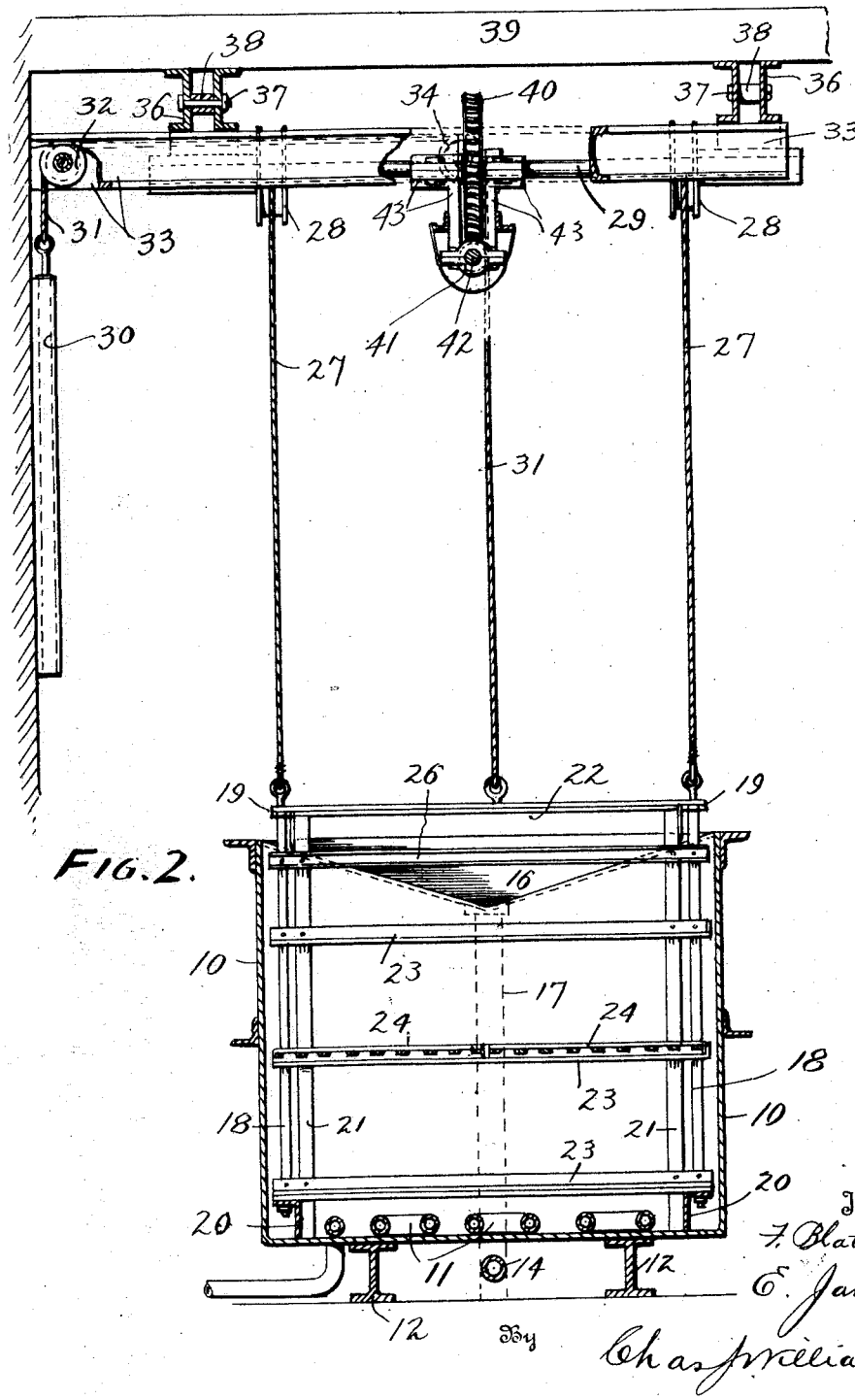

1,677,227

UNITED STATES PATENT OFFICE.

FREDERICK BLATTNER, JR., AND EMIL JANKE, OF BROOKLYN, NEW YORK.

COOKING APPARATUS.

Application filed October 15, 1923. Serial No. 668,647.

Our invention has to do with cooking food such as hams and corned beef on a large scale, the apparatus embodying our invention being capable, for instance of cooking at one time two and one half tons of ham, and the primary object of the invention is to secure the thorough uniform cooking of these large quantities of meat and to do so with a minimum of labor and without danger of injury to the workmen. Other objects and advantages of the invention will appear from the detailed description which is given hereinafter of what we now regard as a most satisfactory embodiment of our invention. Our invention consists in whatever is described by or is included within the terms or scope of the appended claim.

In the annexed drawings:

Fig. 1 is a view partly in side elevation and partly in longitudinal section of apparatus embodying the invention;

Fig. 2 is a section on the line 2—2 of Fig. 1.

Describing generally the embodiment of our invention shown in the drawing the apparatus comprises an oblong tank, a steam coil at the bottom thereof, a pump for circulating water through the tank so as to assure a uniform temperature, a cradle or frame adapted to support trays or shelves for the food articles to be cooked and power means for lowering and raising the cradle or frame to place the articles of food upon the shelves in the water in the tank, and to remove the same therefrom when cooked so that they may be removed from the shelves and replaced by other articles to be cooked.

Describing in detail what is shown in the drawings the tank, 10, has bottom, side and end walls made of sheet steel with its top open and so constructed and braced as to have all required strength to withstand the pressure of the cooking water contained and circulated therein, there being close to the bottom a steam heating coil, 11, which is connected through the bottom of the tank to the steam line, the tank resting at its bottom on several I-beams, 12, and supported a spaced distance above the floor. At one end of the tank on the outside is located a rotary pump, 13, the outlet of which is connected by a pipe, 14, that passes beneath the tank and discharges into the far end of the tank near the bottom thereof, while the pump inlet is connected by a pipe, 15, near the upper part of the tank at the opposite end. By this means the circulation of the cooking water in the tank is accomplished and thus a uniform temperature assured. The tank at one end in the upper part thereof has a funnel-like extension, 16, from the bottom of which leads a discharge pipe, 17, for automatically removing from the tank the fat which during the cooking operation floats to the surface of the water in the tank and thereby such fat is salvaged, it being delivered from the draw-off pipe, 17, to a suitable receptacle.

Vertically movable within the tank is a cradle that is a framework which consists of a vertical post or standard, 18, at each of the four corners of the tank which at the top are connected in pairs at the tank ends by a horizonal cross bar, 19, and at the bottom are bolted or otherwise attached to a rectangular frame, 20, made of angle iron which fits loosely within the tank around the heating coil, 11, and there are also four intermediate standards, 21, which are connected to it horizontal cross bar, 22, and are attached at the bottom to said frame, 20. At intervals each pair of standards has attached to it horizonal angle bars, 23, which forms supports for racks or slatted trays or shelves, 24, upon which pans or vessels, 25, containing for example ham or corn beef are supported and according as the cradle is raised or lowered are submerged in the water in the tank or lifted therefrom. Each shelf or tray is made of two sections or halves one half being towards the front of the tank and the other towards the back of the tank so that the work of placing food upon and removing it from the shelves may be facilitated and make it unnecessary for the workman to lean over the side of the tank to reach the articles of food with the danger of losing his balance and falling into the tank and being scalded by the hot water therein, this occurrence being possible and having sometimes happened with apparatuses of other construction employing large tanks. One section or half of a shelf will be removed from the ledges, 23, by being slid or lifted therefrom and the remaining section will be drawn along the ledge to the side of the tank at which the workman stands so that he can readily place thereon the desired number of articles of food or remove the same therefrom and thereafter such section is pushed towards the rear of the tank and supporting its quota of articles of food, if the loading operation is being performed, and then the remaining half or section is put upon the ledges and supplied with its quota of its articles of food. If the food to be cooked is not placed in containers or pans having sufficient weight to cause the sinking or submergence thereof into the water and the articles of food are apt to float within the water, their submergence is effected by placing in an upper part of the cradle, the shelves which are slid into channel bars, 26, that are secured to the standards near the top thereof, the channel bars being provided to force the shelves into the water in the tank as they press upon the floating articles of food in the tank.

The problem of supporting the frame or cradle with so great a weight as two and one half tons during the lowering and lifting operation was one of difficulty because the danger of buckling or collapse of the supporting frame or cradle, without using an objectionable weight of material. We solved this problem by suspending the frame or cradle at each of its four corners by a hoisting rope or wire cable, 27, attached to the top of each of the four corner standards and thence passing upward to a drum, 28, fixed to a shaft, 29, on an overhead frame bolted or otherwise secured to the ceiling above the tank and by counterbalancing the weight of the cradle and the food thereon by a weight, 30, suspended by wire ropes or cables, 31, attached to the cross bars, 22, connecting the intermediate standards, 21, the load of or upon the cradle being thus supported at the ends and at points intermediate the ends. The counterbalance suspending wire cables, 31, in the case of each cable pass over a pulley, 32, supported between a pair of channels, 33, at one end thereof and a pulley, 34, at midlength of such channels, the cable passing from the pulley, 34, downward to the center of the cross-bar, 22. The pair of channels, 33, ar held together by cross bolts, 34, which pass through spacing tubes, 35, which serve to journal the pulleys 32 and 34.

Extending at right angles to the channels, 33, and above the latter are two beams situated respectively near the ends of the channels, 33. Each of such beams consist of a pair of channels, 36, which are bolted together by cross bolts, 37, which pass through spacing tubes, 38, between each pair of channels thus providing a space between the channels for bolts, 39, which pass through a space between the channels, 33, as well as the space between the channels, 36, and into or through the ceiling, to which the overhead supporting frame thus made up of the spaced channels is attached and from which it is suspended. It will be seen that by the spacing of the channels going to make up each of the beams the overhead frame thus constituted may have its elements or members adjusted to whatever position the dimensions of the tank and cradle require.

As will be understood there are two shafts, 29, and they extend at right angles to the beams composed of the pairs of channels, 36, and such shafts are journaled in boxes bolted to the underside of such beams. At midlength each shaft, 29, has keyed to it a worm wheel, 40, which meshes with a worm, 41, on a shaft, 42, suspended by a hanger bearing, 43, from the shaft, 29, and upon the shaft, 42, is a band wheel, 44, which by belting to a countershaft driven by an electric motor (not shown) receives power to simultaneously rotate both worms and thereby rotate both wheels and through the latter effect the winding or unwinding of the cables, 27, to cause vertical movement of the cradle to place articles of food supported thereon into and out of the cooking water in the tank. The worm gearing serves to support the cradle in a raised position without the employment of any additional special locking means and constitute a simple and powerful form of gearing for lifting the great load upon the cradle, it being possible to use a one horsepower electric motor for the work. A suitable clutch is provided by which the application of power from the motor is controlled so that the operator can stop the vertical movement of the cradle at any desired position so as to make the loading and unloading of the shelves convenient for the workmen and thus save unnecessary effort and waste of time. The vertical movement of the cradle proceeds very slowly and hence there is no danger of the operator being injured which might exist with fast moving machinery.

The cradle suspending cables, 27, are each attached to the cradle by an eye-bolt, 45, which has threaded ends for vertical adjustment so as to enable the cradle to be suspended evenly in a horizontal position.

When the cradle is fully lowered into the tank the vertical leg of the angle iron frame, 20, rests upon the bottom of the tank and thus the load is taken from the suspending cables 27.

It will be seen that by our invention we provide cooking apparatus of extraordinary capacity as to quantity of food cooked at a time, by which a minimum of labor is required in the operation, there is freedom from danger of injury or harm to the workmen, and it is assured that the cooking will be done uniformly.

What we claim is:

A cooking apparatus comprising an oblong tank, a cradle having four standards at the four corners of the tank and intermediate standards, horizontal shelf-supporting bars extending in vertical series horizontally in the spaces between the adjacent standards and attached to the standards, shelves supported by said bars, the shelves being made of front and back sections, and means for moving the cradle with the shelves vertically into and out of the tank to expose the shelves for access.

In testimony whereof we hereunto affix our signatures.

FREDERICK BLATTNER, Jr.
EMIL JANKE.